United States Patent
Pfaffenberger, II

(10) Patent No.: US 6,354,749 B1
(45) Date of Patent: Mar. 12, 2002

(54) HOUSING FOR SURVEILLANCE CAMERA

(75) Inventor: James L. Pfaffenberger, II, Marietta, GA (US)

(73) Assignee: Videolarm, Inc., Decatur, GA (US)

( * ) Notice: Subject to any disclaimer, the term of this patent is extended or adjusted under 35 U.S.C. 154(b) by 0 days.

(21) Appl. No.: 09/569,675

(22) Filed: May 12, 2000

Related U.S. Application Data

(63) Continuation-in-part of application No. 09/150,104, filed on Sep. 9, 1998, now abandoned.

(51) Int. Cl.[7] .............................................. G03B 17/00
(52) U.S. Cl. ........................ 396/427; 396/428; 348/143; 348/151
(58) Field of Search ................................ 396/419, 427, 396/428; 348/143, 151; 352/243, 242

(56) References Cited

U.S. PATENT DOCUMENTS

| | | |
|---|---|---|
| 3,879,742 A | 4/1975 | Smith |
| 4,320,949 A | 3/1982 | Pagano |
| D275,294 S | 8/1984 | Pagano |
| 4,618,886 A | 10/1986 | Mooney |
| 4,651,144 A | 3/1987 | Pagano |
| 4,652,930 A | 3/1987 | Crawford |
| 4,796,039 A | 1/1989 | Pagano |
| 4,890,713 A | 1/1990 | Pagano |
| 4,920,367 A | 4/1990 | Pagano |
| D307,759 S | 5/1990 | Pagano |
| D314,501 S | 2/1991 | Pagano |
| 5,107,286 A | 4/1992 | Sergeant et al. |
| 5,223,872 A | 6/1993 | Stiepel et al. |
| 5,224,675 A | 7/1993 | Ellenberger et al. |
| 5,240,220 A | 8/1993 | Ellerbaum |
| 5,394,184 A | 2/1995 | Anderson et al. |
| 5,394,209 A | 2/1995 | Stiepel et al. |
| 5,418,567 A * | 5/1995 | Boers et al. ................. 348/143 |
| 5,689,304 A | 11/1997 | Jones et al. |
| 5,689,734 A | 11/1997 | Bauer et al. |
| 5,765,043 A | 6/1998 | Tyler |
| 5,852,754 A | 12/1998 | Schneider |
| 5,940,122 A | 8/1999 | Kizawa et al. |

* cited by examiner

*Primary Examiner*—Alan A. Mathews
(74) *Attorney, Agent, or Firm*—Bradley K. Groff; Gardner Groff Mehrman & Josephic, P.C.

(57) ABSTRACT

A housing for a surveillance camera has an upper housing that is cylindrical and made of steel or the like to withstand ballistic attack. The upper housing houses the pan-and-tilt mechanism, which is suspended from the inside of the upper housing. The camera is carried by the pan-and-tilt mechanism, and extends into a lower, transparent, housing. An inner liner is within the lower housing and covers the camera, the inner liner being made of hardened aluminum or the like to withstand ballistic attack. The inner liner covers the camera, except that a slot allows the camera lens to receive images through the lower housing. A shield is fixed to the camera to move with the camera, covering the slot in the inner liner, the shield defining one opening for the camera lens. The inner liner and the shield are dark in color to prevent visual location of the camera lens, and a polymeric guard physically protects the camera lens.

20 Claims, 5 Drawing Sheets

HOUSING FOR SURVEILLANCE CAMERA

CROSS REFERENCE TO RELATED APPLICATION

This continuation-in-part application filed pursuant to 37 CFR 1.53(b) is a continuation-in-part of parent application Ser. 09/150,104 entitled "Housing for Surveillance Camera", which was filed on Sep. 9, 1998 by the same inventor as this application now abandoned.

BACKGROUND OF THE INVENTION

1. Field of the Invention

This invention relates generally to housings for surveillance cameras, and is more particularly concerned with a ballistic rated housing having a domed lower shell.

2. Discussion of the Prior Art

It is common to use closed circuit television cameras for remote surveillance of an area. In locations such as banks and retail stores, television cameras are mounted in plain view of customers. This is possible because the camera is indoors, and is sufficiently protected to prevent unauthorized tampering.

When a surveillance camera is to be placed outside, the camera must be enclosed within a weatherproof housing. Since the housing is to be mounted outside, the housing must be weatherproof and tamperproof. Camera housings such as those shown in U.S. Pat. No. 4,320,949 are acceptable for many outdoor locations, but not for locations wherein the camera might be intentionally disabled through the use of rocks, gunfire, or other missiles. There is sufficient terrorist activity that airports, seaports, military installations and other likely targets require surveillance; the cameras providing such surveillance require considerable protection.

Providing protection for the surveillance camera requires the use of components that are ballistic rated. The prior art includes some ballistic-rated camera housings, but most of the prior art housings comprise simply heavy steel plate covering the camera, and the location of the camera lens is obvious. The wires and the pan-and-tilt mechanisms are not shielded, and may be disabled by gunfire. Also, the camera lens is usually not shielded in the prior art housings, so the camera itself is subject to damage. One prior art housing, shown in U.S. Pat. No. 4,920,367 discloses a ballistic-rated housing having a generally spherical shape, the housing being formed of a plurality of layers of polymeric material and enclosing the camera and the pan-and-tilt mechanism. The cables are also enclosed, contained in the pipe from which the housing is suspended. Nevertheless, the polymeric housing cannot be as strong as metal, and the camera and pan-and-tilt apparatus are not as well protected as may be desired.

SUMMARY OF INVENTION

The present invention provides a surveillance camera housing having a metal upper housing carried by a bracket that contains wires and the like leading to the camera and the pan-and-tilt mechanism. The lower housing is hemispherical, and transparent so the camera can photograph through any part of the lower housing. The camera is protected by an inner housing of metal or the like, the inner housing defining a slot for the camera lens to follow as the camera tilts. The inner housing rotates with the camera, so only the one slot is required. To protect the camera at the slot, there is a shield fixed with respect to the camera and tiltable with the camera, the shield being aligned with the slot in the inner housing. The shield defines an opening therein as a viewing window for the camera; and, a ballistic-rated window is in front of the camera lens to protect the camera at the viewing window of the shield.

There are metal members around the camera except at the camera lens, and the camera lens is covered by a ballistic rated polymeric material, so the entire camera is protected. The lower housing may be dark in color; and, the inner housing and shield are dark, so one cannot determine the location of the camera lens. Further, the upper housing includes an annular member that will receive the shock from an impact on the lower housing, so the force will be absorbed by the upper housing instead of by the pan-and-tilt mechanism. Thus, the camera housing of the present invention provides protection for the camera from all directions.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENT

Figure 1:
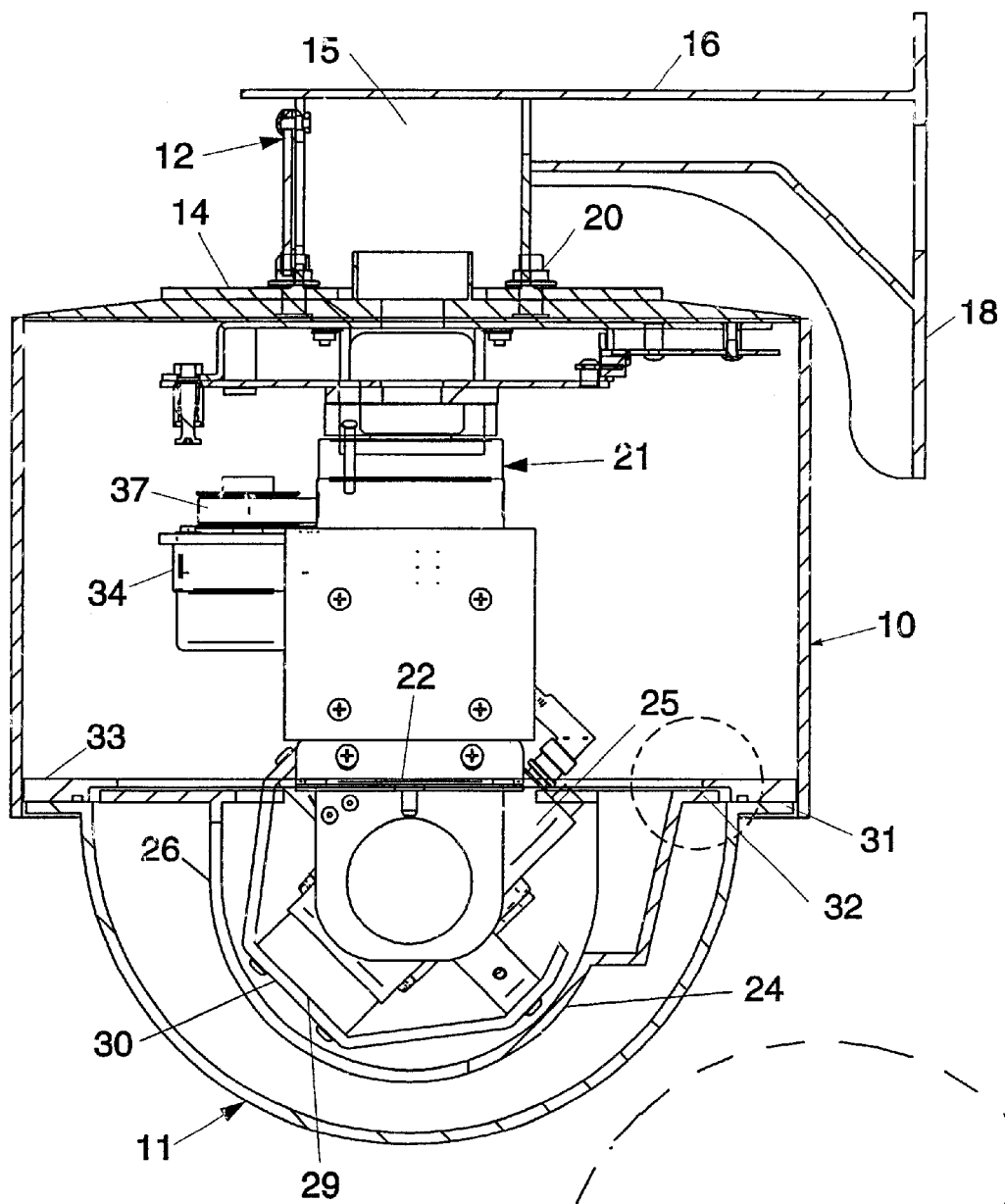
FIG. 1 is a diametrical cross-sectional view of a camera housing made in accordance with the present invention.

For purposes of defining this invention, "ballistic rated" means that a material can survive an attack by a bullet with no penetrations of the material by the bullet. Underwriters Laboratory ("UL") rates materials based on the bullet type, nominal bullet mass and minimum bullet velocity. Two such UL ratings are used to define the invention and are shown in Table 1 below.

TABLE 1

Minimum Standards For Rating Materials.

| Rating | Test Ammunition | Nominal Bullet Mass | Minimum Test Bullet Velocity | Permitted Penetrations |
|---|---|---|---|---|
| I | 38 Special RN Lead, or | 158 gr. | 850 ft/s | 0 |
|  | 22 LRHV Lead | 40 gr | 1050 ft/s | 0 |
| III-A | 44 Magnum Lead SWC gas checked, or | 240 gr | 1400 ft/s | 0 |
|  | 9 mm FMJ | 124 gr | 1400 ft/s | 0 |

In the present invention, certain parts are designed to withstand a Rating I attack and certain parts are designed to withstand a rating III-A attack. Surviving an attack means that a bullet, with characteristics as defined in Table 1, incident upon a given component from any angle at any location thereon, does not pierce the component nor render the component inoperable. The components designed to withstand at least a Level I at any angle thereof attack are parts 24, 32, 28, 29, 33, 10, 12, 14, 15, 16 and 18. The components designed to withstand a Level III-A attack at any angle thereof are parts 33 and 10. The location of these components are shown in the drawings, which are described in detail in the following paragraphs of this section.

Referring now more particularly to the drawings, and to that embodiment of the invention here presented by way of illustration, FIG. 1 shows a housing comprising a generally cylindrical upper housing 10 and a hemispherical lower housing 11. A bracket generally designated at 12 supports the housing, the bracket including a plate 14 for attachment to the upper housing 10, the plate 14 being carried by a box 15. The box 15 is, in turn, carried by an arm 16, which terminates in a downwardly extending flange 18

It can be seen in FIG. 1 of the drawings that the plate 14 defines a hole therein so wires, cables and the like can pass from upper housing 10, through the plate 14, and into the hollow bracket 12. Thus, the wires and cables for operating a surveillance camera within the housing are protected at all times.

Figure 3:
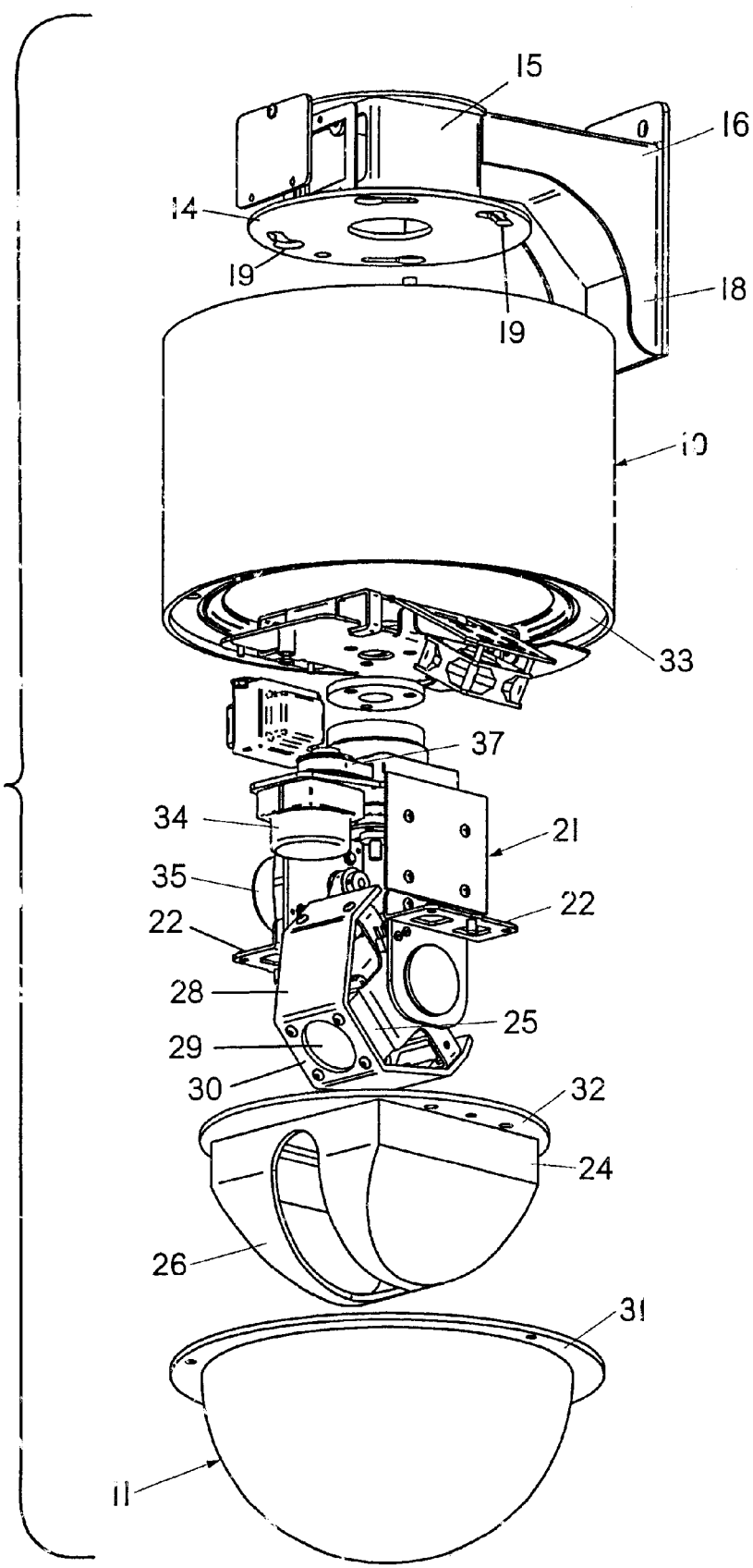
FIG. 3 is an exploded perspective view showing the entire housing, and looking up at the housing.
Figure 4:
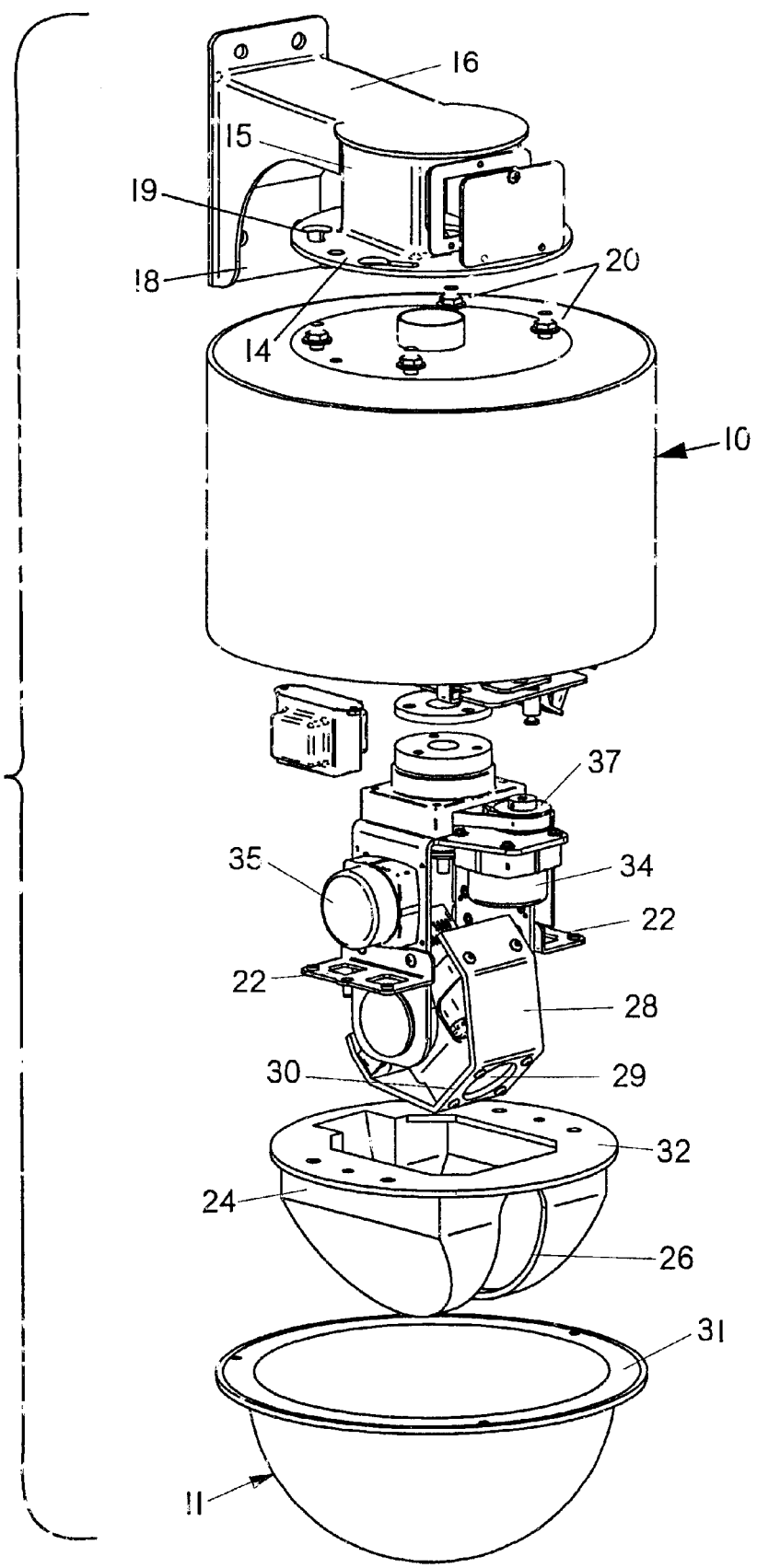
FIG. 4 is a view similar to FIG. 3, but looking down at the housing.

With attention directed to FIGS. 3 and 4 in addition to FIG. 1, it can be seen that the plate 14 has key-hole slots 19 so attachment to, and detachment from, the upper housing using the screws 20 is quick and simple.

In view of the mounting arrangement discussed above, it will be readily understood by those skilled in the art that the housing of the present invention can be mounted on a wall, using the bracket shown, or the housing can be suspended from a ceiling by using a straight pipe or the like fixed to the plate 14.

Within the upper housing 10 there is a pan-and-tilt mechanism designated at 21, and a pair of flanges 22 is carried by the pan-and-tilt mechanism. The flanges 22, in turn, support an inner liner 24 which contains the camera 25. It will be seen that the liner 24 defines a slot 26 therein, and a shield 28 closes this slot except for the immediate area of the camera lens 29.

The upper housing 10 includes an annular ring 33 fixed thereto at its lower end; and the ring 33 attaches to a flange 31 of the lower housing 11 to support the lower housing 11. The lower housing 11 covers the inner liner 24 and all the apparatus therein. It will be realized that the lower housing 11 is generally transparent since the camera 25 must receive its images through the lower housing. The lower housing is usually a dark, smoky color to conceal the interior of the housing, yet light enough to allow good images from the camera 25. The exterior surface of the inner liner 24 is preferably black, or at least dark in color, and the shield 28 will be similarly colored. There is no internal light within the housing, so one will be unable to determine the location of the camera lens. It will be understood that the lens itself will also be dark, which further hinders location.

Figure 2:
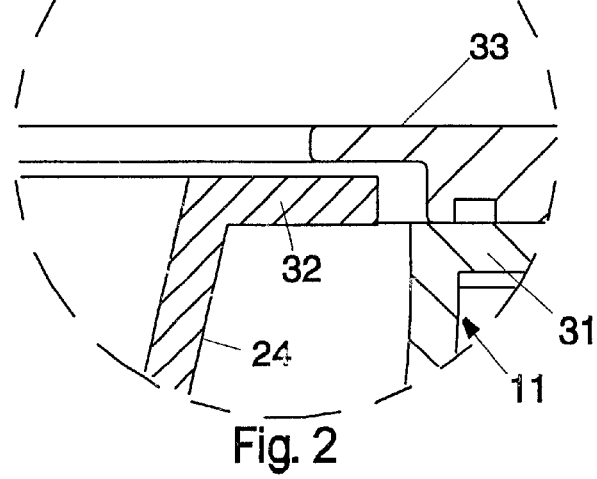
FIG. 2 is an enlarged, fragmentary view showing a detail of the mounting arrangement.

Looking at FIG. 2 of the drawings, it will be remembered that the camera 25 and the pan-and-tilt mechanism 21 are carried from the upper housing 10. The lower housing 11 cannot be bullet proof because of the necessity that it be transparent; therefore, if a shot is fired at the lower housing 11, the bullet will probably penetrate the lower housing and engage the inner liner 24. The force of the impact will tend to move the mechanism, causing a stress on the parts. To prevent damage to the mechanism, the flange 32 on the inner liner 24 will engage the ring 33 on slight lateral movement, so the ring 33 and the upper housing 10 will absorb the energy. In the embodiment of the invention here shown, the ring 33 extends completely around the upper housing 10, so the ring 33 and housing 10 will receive the force regardless of the direction of the force. The ring 33 is heavy enough to withstand high impact, such as a bullet, and it fills in the space between the flange 32 on the inner liner and the upper housing 10.

Attention is directed to FIG. 3 of the drawings which shows the pan-and-tilt mechanism 21 in more detail. The mechanism 21 is generally conventional, including a motor 34 to drive a vertically extending axle to cause the pan-and-tilt mechanism attached thereto to rotate, or pan. A second motor 35 can drive a horizontally extending axle to cause the camera 25, along with the shield 28, to tilt. An important feature of the mechanism 21 is that both motors 34 and 35 drive through belts, such as the belts 37, rather than gears or the like. The belts are more resilient and are less likely to be damaged, or jammed, by the shock of a ballistic impact.

Continuing to look at FIG. 3 of the drawings, it can be seen that the inner liner 24 has a lower, semi-cylindrical wall that defines the slot 26. Thus, the lens 29 of the camera will stay the same distance from the slot as the camera tilts. In FIGS. 3 and 4, it can be seen that the camera 25 and shield 28 rotate together about the horizontal axis, or during the tilting motions. Therefore, the shield 28 always closes the portion of the slot 26 that is not occupied by the camera lens 29.

Those skilled in the art will realize that the parts of the housing of the present invention can be made of different materials of varying thickness, depending on the degree of security desired. An embodiment has a bracket 12 made of 7 and 10 gauge stainless steel. The top panel of the upper housing 10 is 10 gauge or thicker stainless steel, and the rest of the upper housing is 0.187-inch thick stainless steel.

The lower housing 11 is formed of an acrylic, such as polymethylmethacrylate, and the inner liner is made of 0.187-inch thick hardened aluminum. Similarly, the shield 28 is 0.187-inch thick hardened aluminum. To protect the camera lens itself, there is a transparent cover 30 made of a polycarbonate.

Thus, the upper housing and bracket are made of steel that can easily resist the most common ballistic attack, and the upper housing also protects the pan-and-tilt mechanism from attack. While the acrylic lower housing can be penetrated, the inner liner in conjunction with the shield protects the camera and the transparent polycarbonate cover 30 protects the camera lens. The physical protection, plus the darkness, which tends to prevent visual location of the camera lens, renders the housing very secure.

In some installation applications a sealed enclosure may be desirable in order to maintain a pressurized, non-corrosive atmosphere, such as an inert gas, inside the enclosure. Maintaining such a pressurized atmosphere lowers the occurrence of corrosion of electrical contacts and conductors. Moreover, pressurizing the enclosure with an inert gas would reduce the moisture content of the atmosphere considerably. Reduction of the internal moisture content directly reduces the amount of condensation likely to form on the camera lens or the transparent lower housing. Since condensation could reduce or even eliminate the camera's visibility, such a pressurized atmosphere may be essential to ensure operability, depending upon the location of the surveillance camera. Furthermore, a sealed enclosure has the added benefit of excluding contamination such as dust and other foreign matter from the interior of the enclosure, thereby increasing longevity and reducing maintenance costs of the surveillance system.

Those skilled in the art will understand that seals, such as O-rings, gaskets or the like, can be installed in the housing to seal the interior, and that the interior can be pressurized with nitrogen or other inert gas.

Figure 5:
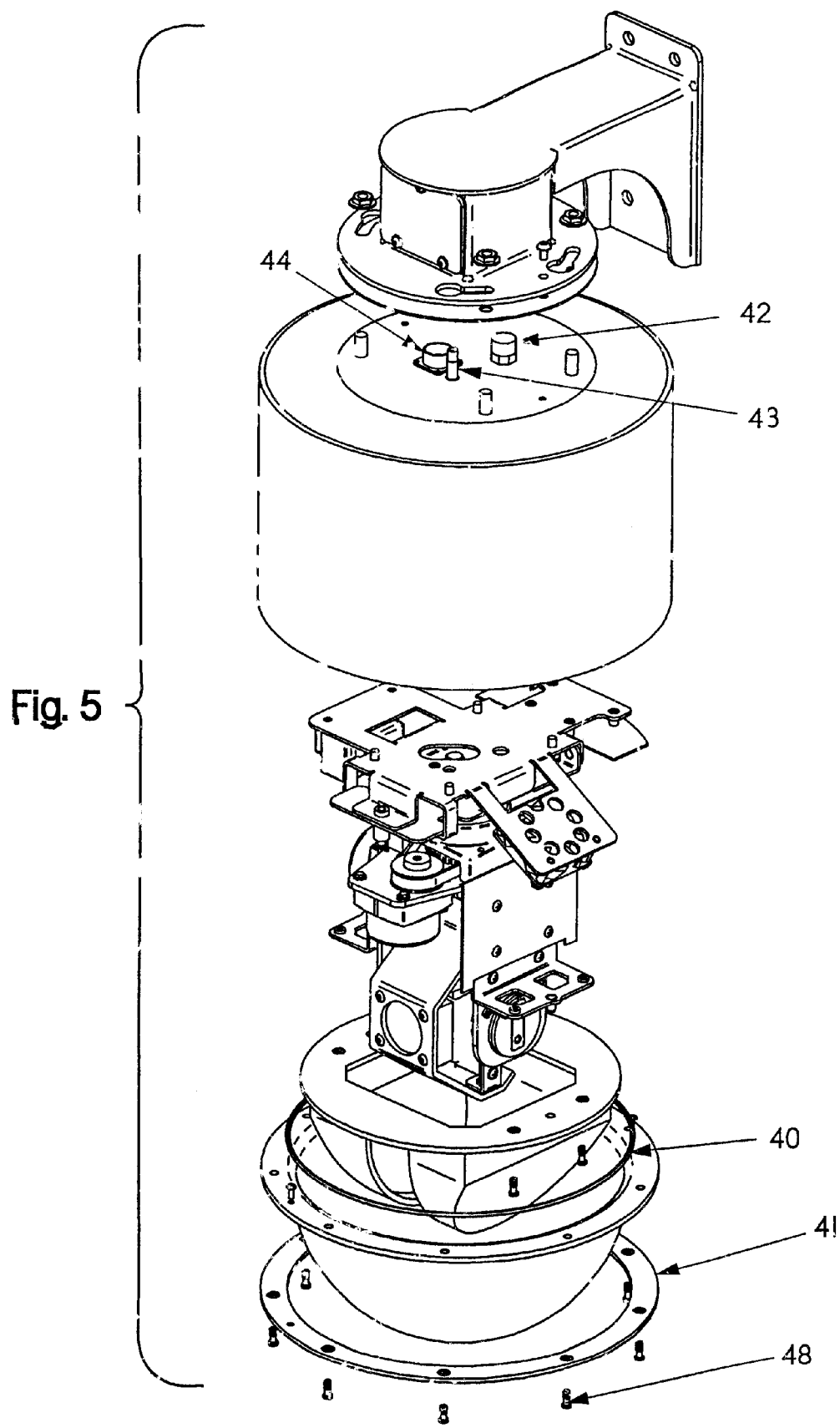
FIG. 5 is an exploded perspective view looking down at and showing the entire housing configured such that the enclosure atmosphere may be pressurized.

Looking at FIG. 5 of the drawings, an O-ring 46 is shown that seals the surfaces between the lower housing and the upper housing. Although an O-ring is shown, one skilled in the art would recognize that a gasket between the upper housing flange and the lower housing flange would also perform a sealing function between the two flange surfaces. Retaining ring 41 has evenly spaced holes located at a radius equal to the average of the outer radius and the inner radius of retaining ring 41. The hole spacing in the retaining ring matches the spacing of recesses drilled and tapped into the upper housing. The holes in the retaining ring allow threaded fasteners 48 to pass through the ring and into the upper housing. The recesses in the upper housing are drilled and tapped to threadably accept the fasteners, thereby retaining the lower housing and retaining ring. Retaining ring 41 ensures that a uniform sealing force is applied around the circumference of the lower housing by evenly distributing the clamping force produced by the fasteners.

Upper housing 10 may be further modified to accept a plurality of fittings that are threadably attached to the top plate of the upper housing. Such a set of fittings may include a fill valve 44, a pressure relief valve 42 and a pressure retaining connector 43. Fill valve 44 provides a connection point for introducing pressurized inert gas into the sealed enclosure. Pressure relief valve 42 protects the enclosure from over pressurization. Pressure retaining connector 43 provides a means for connecting video and electrical signals to the camera and motors inside the enclosure while preventing the pressurized inert gas inside the enclosure from escaping. These fittings are common, off-the-shelf items and known to those skilled in the art.

Figure 6A:
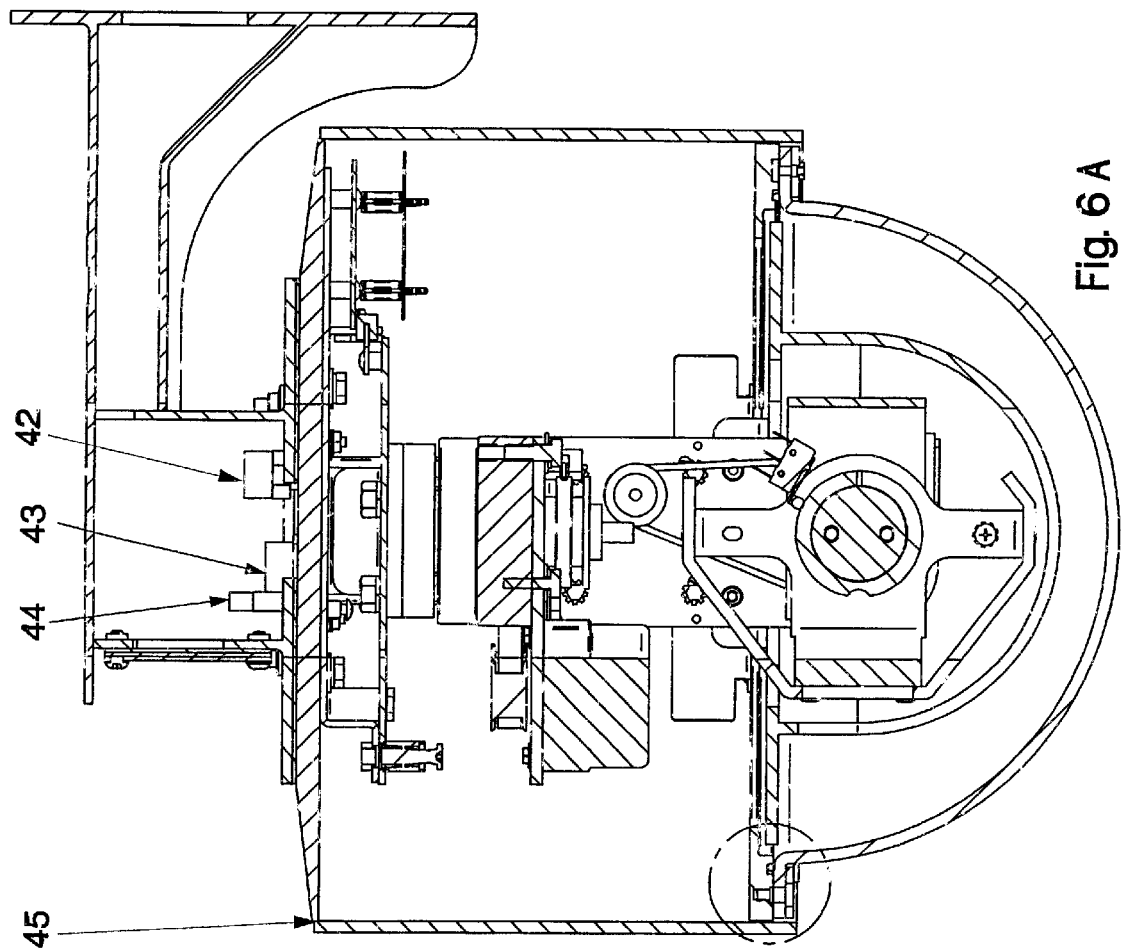
FIG. 6 is a diametrical cross-sectional view of a camera housing made in accordance with the present invention and configured such that the enclosure atmosphere may be pressurized.
Figure 6B:
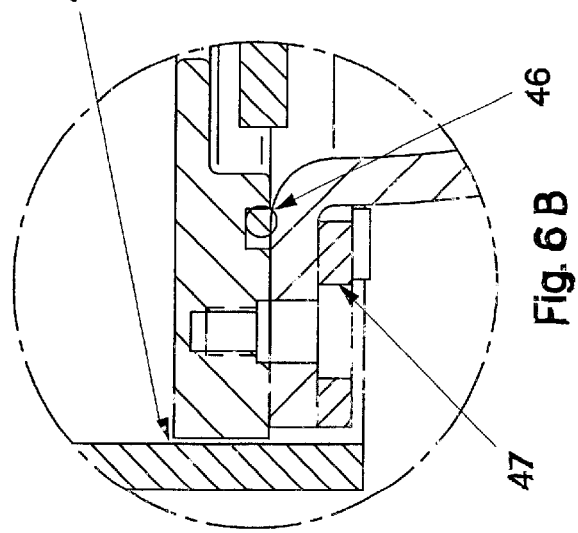

Since the present invention uses an upper housing constructed from a plurality of separate pieces, these pieces must be constructed to form a seal tight unit if internal pressurization of the enclosure is desired. The embodiment of the upper housing shown in FIGS. 5 and 6 is constructed from a round plate and a hollow cylinder. FIG. 5 shows a seal weld 45 around the circumference of the upper housing that joins the upper plate to the cylindrical walls. This seal weld creates an airtight connection between the round plate and the hollow cylinder and results in the joined parts functioning as a singular upper housing.

It will therefore be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

The invention claimed is:

1. An apparatus comprising:
an ballistic rated inner liner defining a slot;
a pan-and-tilt mechanism;
a camera coupled to the pan-and-tilt mechanism, and having a lens positioned in the slot to allow movement of the lens along the slot;
a ballistic rated upper housing coupled to the pan-and-tilt mechanism, the pan-and-tilt mechanism capable of moving the lens to traverse in the slot;
a lower housing composed of a translucent material, the lower housing attachable to the upper housing;
a ballistic rated shield defining a hole therein at the lens, coupled to the camera and positioned to cover and protect the portion of the camera that would be otherwise unprotected from the slot portion not occupied by the lens; and
a ballistic rated cover positioned over the lens to protect the lens.

2. The apparatus of claim 1 further comprising:
an attaching means for fixing the pan-and-tilt mechanism within the upper housing;
a means for supporting the inner liner from the pan-and-tilt mechanism; and
a ring attached to the inner surface of the upper housing and adjacent to the inner liner for limiting lateral movement of the inner liner.

3. The apparatus of claim 2, wherein the ring is carried by the upper housing and extends between the inner liner and the upper housing.

4. The apparatus of claim 1, wherein the upper housing is generally cylindrical, and includes a bracket selectively attachable to the upper housing, the bracket being formed of a ballistic rated material.

5. The apparatus of claim 4, wherein the bracket is made of steel.

6. The apparatus of claim 4 wherein the bracket defines an opening therethrough for receiving wires and cables for operating the camera and pan-and-tilt mechanism.

7. The apparatus of claim 1, wherein the inner liner is dark in color for preventing visual location of the camera lens.

8. The apparatus of claim 1, wherein the lower housing is tinted for preventing visual location of the camera lens.

9. The apparatus of claim 1, wherein the upper housing and the lower housing form an airtight enclosure when attached to one another.

10. The apparatus of claim 9, further comprising a means for introducing a gas into the enclosure.

11. The apparatus of claim 9, further comprising a pressure relief valve.

12. The apparatus of claim 9 further comprising a means for passing power and control signals therethrough without breaching the airtightness of the upper housing.

13. The apparatus of claim 9, further comprising a retaining ring.

14. The apparatus of claim 9 further comprising an O-ring located at the mating surface between the upper housing and the lower housing.

15. The apparatus of claim 9 further comprising a gasket located at the mating surface between the upper housing and the lower housing.

16. An apparatus comprising:
an inner liner defining a slot;
a pan-and-tilt mechanism;
a camera coupled to the pan-and-tilt mechanism, and having a lens positioned in the slot to allow movement of the lens along the slot;
a upper housing coupled to the pan-and-tilt mechanism, the pan-and-tilt mechanism capable of moving the lens to traverse in the slot;
a lower housing composed of a translucent material, the lower housing attachable to the upper housing;
a shield defining a hole therein at the lens, coupled to the camera and positioned to cover and protect the portion of the camera that would be otherwise unprotected from the slot portion not occupied by the lens; and
a cover positioned over the lens to protect the lens.

17. The apparatus of claim 16 wherein the inner liner is made of aluminum.

18. The apparatus of claim 16 wherein the upper housing is made of steel.

19. The apparatus of claim 16 wherein the shield is made of steel.

20. The apparatus of claim 16 wherein the cover is made of polycarbonate.

* * * * *